(12) United States Patent
Matsuda et al.

(10) Patent No.: US 8,865,820 B2
(45) Date of Patent: Oct. 21, 2014

(54) FLUORINE-CONTAINING CURABLE COMPOSITION AND RUBBER ARTICLE

(75) Inventors: Takashi Matsuda, Annaka (JP); Noriyuki Koike, Annaka (JP); Hirofumi Kishita, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 890 days.

(21) Appl. No.: 13/048,133

(22) Filed: Mar. 15, 2011

(65) Prior Publication Data
US 2011/0237732 A1    Sep. 29, 2011

(30) Foreign Application Priority Data
Mar. 24, 2010   (JP) ................................. 2010-067876

(51) Int. Cl.
| | | |
|---|---|---|
| *C09J 183/07* | (2006.01) | |
| *C08G 77/08* | (2006.01) | |
| *C08G 65/336* | (2006.01) | |
| *C08G 65/00* | (2006.01) | |
| *C08L 83/16* | (2006.01) | |
| *C08G 77/12* | (2006.01) | |

(52) U.S. Cl.
CPC ............... *C08L 83/16* (2013.01); *C08G 65/336* (2013.01); *C08G 77/12* (2013.01); *C08G 65/007* (2013.01)
USPC .......................................... 524/493; 524/588

(58) Field of Classification Search
USPC ................................................. 524/493, 588
See application file for complete search history.

(56) References Cited

U.S. PATENT DOCUMENTS

| | | | | |
|---|---|---|---|---|
| 5,665,846 A | * | 9/1997 | Sato et al. ........................ | 528/15 |
| 2002/0132902 A1 | * | 9/2002 | Shiono ........................... | 524/492 |

FOREIGN PATENT DOCUMENTS

| | | |
|---|---|---|
| EP | 1 223 194 A1 | 7/2002 |
| JP | 2990646 | 10/1999 |

OTHER PUBLICATIONS

The Extended European Search Report issued Jun. 14, 2011, in Application No. / Patent No. 11002379.3-1214.

* cited by examiner

*Primary Examiner* — Ling Choi
*Assistant Examiner* — Chun-Cheng Wang
(74) *Attorney, Agent, or Firm* — Oblon, Spivak, McClelland, Maier & Neustadt, L.L.P.

(57) ABSTRACT

A fluorine-containing curable composition which is less viscous, and which can produce a cured article having excellent heat resistance, chemical resistance, solvent resistance, and mechanical strength is provided. The fluorine-containing curable composition comprises (a) 100 parts by weight of a straight chain fluorine-containing polymer having at least two alkenyl groups per molecule represented by the following formula (1):

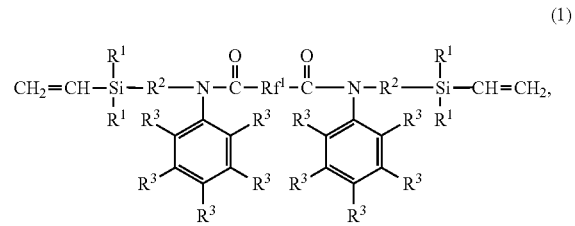

(1)

said polymer having a number average molecular weight of 1,000 to 100,000; (b) a fluorine-containing organosilicon compound having at least 2 hydrogen atoms bonded to the silicon atom per molecule at an amount such that molar ratio of hydrosilyl group (SiH group) in the component (b) to the alkenyl group in the component (a) is in the range of 0.4 to 5.0; (c) a catalytic amount of a hydrosilylation catalyst; and (d) 1 to 100 parts by weight of a silica filler.

6 Claims, No Drawings

FLUORINE-CONTAINING CURABLE COMPOSITION AND RUBBER ARTICLE

CROSS-REFERENCE TO RELATED APPLICATION

This non-provisional application claims priority under 35 U.S.C. §119(a) on Patent Application No. 2010-067876 filed in Japan on Mar. 24, 2010, the entire contents of which are hereby incorporated by reference.

TECHNICAL FIELD

This invention relates to a fluorine-containing curable composition which is less viscous and easy to mold and which is capable of producing a cured article having an improved heat resistance, chemical resistance, solvent resistance, and mechanical strength, and more specifically, a fluorine-containing curable composition which can be cured at a high speed and which is capable of producing a cured article with excellent acid resistance. This invention also relates to a rubber article prepared by curing the composition.

BACKGROUND ART

Japanese Patent No. 2990646 discloses that a cured article having excellent heat resistance, chemical resistance, solvent resistance, releasability, water repellency, oil repellency, weatherability, and the like can be produced from a composition comprising a straight chain perfluoropolyether compound having at least 2 alkenyl groups per molecule and having perfluoropolyether structure in its backbone; an organosilicon compound having at least 2 hydrogen atoms bonded to the silicon atom per molecule; and a hydrosilylation catalyst. The polymer described in Japanese Patent No. 2990646 which has the terminal structure of [an aromatic ring-Si atom-vinyl group] has high curing speed since it has [Si atom-vinyl group] structure. However, the moiety wherein an aromatic ring is bonded to the Si atom is known to contribute for reducing the acid resistance. On the other hand, a polymer having no [an aromatic ring-Si atom-vinyl group] structure on its terminal (for example, a polymer having the terminal structure of [an aromatic ring-an alkylene group-vinyl group] and a polymer having the terminal structure of [amide group having an aromatic ring substituent on its side chain-alkylene group-vinyl group]) had excellent acid resistance while such polymer had the drawback of inferior curing speed.

The compositions as described above had the performance sufficient for almost all applications. However, further improvement in acid resistance is desirable for use in an environment where the cured article is brought in contact with a strong acid, for example, in the case of sealants used in a chemical plant. Higher curing speed is also important in view of molding efficiency.

SUMMARY OF INVENTION

The present invention has been completed in view of the situation as described above, and an object of the present invention is to provide a fluorine-containing curable composition which is less viscous and easy to mold, and which can be cured into a product having excellent heat resistance, chemical resistance, solvent resistance, and mechanical strength, and more specifically, a fluorine-containing curable composition which can be cured at a high speed and which can be cured into a product having an excellent acid resistance. Another object of the present invention is to provide a rubber article prepared by using this composition.

The inventors of the present invention have made an intensive study, and found that production of a fluorine-containing curable composition which is less viscous and easy to mold, and which can produce a cured article having excellent heat resistance, chemical resistance, solvent resistance, and mechanical strength, and in particular, which exhibits markedly high curing speed and improved acid resistance is enabled by using a particular straight chain fluorine-containing polymer for the fluorine-containing base polymer. More specifically, the inventors found that such production is enabled by using a polymer having at least 2 alkenyl groups in 1 molecule of the base polymer, namely, a straight chain fluorine-containing polymer having a number average molecular weight of 1,000 to 100,000 which is represented by the following general formula (1):

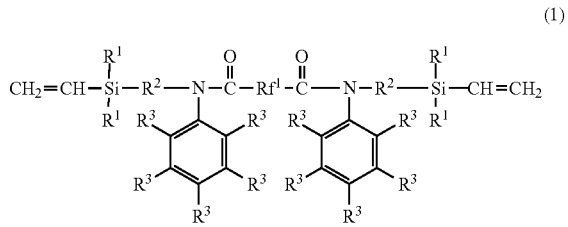

wherein $R^1$ is independently vinyl group or an alkyl group containing 1 to 4 carbon atoms, $R^2$ is an alkylene group containing 1 to 6 carbon atoms, $R^3$ is independently hydrogen atom or an alkyl group containing 1 to 4 carbon atoms which is optionally substituted with fluorine, $Rf^1$ is a perfluoroalkylene group or a divalent group having a perfluoropolyether structure; and which has a particular polymer terminal structure containing a vinyl group bonded to the silicon atom [Si atom-vinyl group] but not containing the moiety wherein an aromatic ring is bonded to the silicon atom [an aromatic ring-Si atom]. The present invention has been completed on the basis of such finding.

Accordingly, the present invention provides a fluorine-containing curable composition and a rubber article as described below.

[1] A fluorine-containing curable composition comprising
(a) 100 parts by weight of a straight chain fluorine-containing polymer having at least two alkenyl groups per molecule represented by the following formula (1):

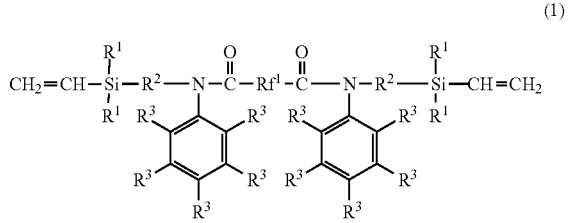

wherein $R^1$ is independently vinyl group or an alkyl group containing 1 to 4 carbon atoms, $R^2$ is an alkylene group containing 1 to 6 carbon atoms, $R^3$ is independently hydrogen atom or an alkyl group containing 1 to 4 carbon atoms which is optionally substituted with fluorine, $Rf^1$ is a group having a perfluoroalkylene group or a divalent group having perfluoropolyether structure, said polymer having a number average molecular weight of 1,000 to 100,000;

(b) a fluorine-containing organosilicon compound having at least 2 hydrogen atoms bonded to the silicon atom per molecule at an amount such that a molar ratio of hydrosilyl group (SiH group) in the component (b) to the alkenyl group in the component (a) is in the range of 0.4 to 5.0;

(c) a catalytic amount of a hydrosilylation catalyst; and (d) 1 to 100 parts by weight of a silica filler.

[2] A fluorine-containing curable composition according to [1] wherein the group having the divalent perfluoropolyether structure has the structure represented by the following formula (2):

(2)

wherein g is an integer of 1 to 6, and h is an integer of 20 to 600.

[3] A fluorine-containing curable composition according to [2] wherein the group having the divalent perfluoropolyether structure has a structure selected from the group consisting of structures represented by the following formulae (3) to (5):

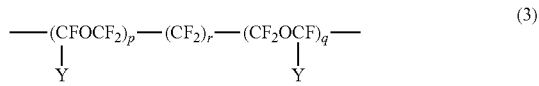

(3)

wherein Y is fluorine atom or trifluoromethyl group, p, q, and r are independently an integer satisfying that $p \geq 0$, $q \geq 0$, $0 \leq p+q \leq 600$, and $0 \leq r \leq 6$ excluding $p=q=r=0$;

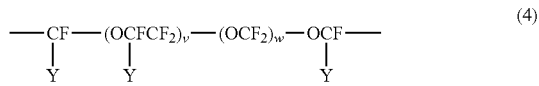

(4)

wherein Y is fluorine atom or trifluoromethyl group, v and w are independently an integer satisfying that $0 \leq v \leq 300$ and $0 \leq w \leq 300$ with the proviso that $1 \leq v+w \leq 600$; and

(5)

wherein z is an integer of $1 \leq z \leq 600$.

[4] A fluorine-containing curable composition according to any one of the above [1] to [3] wherein the component (b) has at least 1 monovalent perfluoroalkyl group, monovalent group having a perfluoropolyether structure, divalent perfluoroalkylene group, or divalent group having a perfluoropolyether structure per molecule; and has at least 2 hydrogen atoms bonded to the silicon atom.

[5] A fluorine-containing curable composition according to any one of the above [1] to [4] wherein the component (d) is a silica filler having a hydrophobicized surface and a BET specific surface area of at least 30 m$^2$/g.

[6] A rubber article produced by using the fluorine-containing curable composition of any one of the above [1] to [5].

Advantageous Effects of Invention

The present invention provides a fluorine-containing curable composition which is less viscous and easy to mold, and which can produce a cured article having excellent heat resistance, chemical resistance, solvent resistance, and mechanical strength, and in particular, a fluorine-containing curable composition which can be cured at a high speed to produce a cured article having excellent acid resistance. In addition, the rubber article produced by curing the composition as described above is useful as a rubber part in automobiles, chemical instruments, and chemical plants.

DESCRIPTION OF EMBODIMENTS

The fluorine-containing curable composition of the present invention comprises (a) a straight chain fluorine-containing polymer having at least two alkenyl groups per molecule represented by the following formula (1), the fluorine-containing polymer having a number average molecular weight of 1,000 to 100,000, (b) a fluorine-containing organosilicon compound having at least 2 hydrogen atoms bonded to the silicon atom (i.e., SiH groups) per molecule, (c) a hydrosilylation catalyst, and (d) a silica filler.

Component (a)

The component (a) of the present invention is a straight chain fluorine-containing polymer having a number average molecular weight of 1,000 to 100,000. This straight chain fluorine-containing polymer has at least two alkenyl groups per molecule, and is represented by the following formula (1):

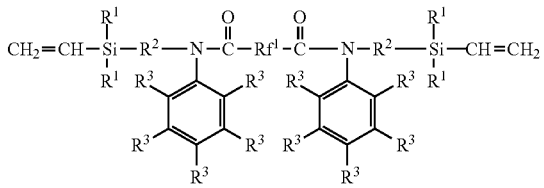

(1)

wherein $R^1$ is independently vinyl group or an alkyl group containing 1 to 4 carbon atoms, $R^2$ is an alkylene group containing 1 to 6 carbon atoms, $R^3$ is independently hydrogen atom or an alkyl group containing 1 to 4 carbon atoms which is optionally substituted with fluorine, $Rf^1$ is a group containing a perfluoroalkylene group or a divalent group containing perfluoropolyether structure.

In the formula (1), $R^1$ is independently vinyl group or an alkyl group containing 1 to 4 carbon atoms. Examples of the alkyl group containing 1 to 4 carbon atoms include methyl group, ethyl group, propyl group, and butyl group, and the most preferred for the $R^1$ are vinyl group and methyl group. $R^2$ is an alkylene group containing 1 to 6 carbon atoms, and preferably 2 to 6 carbon atoms such as methylene group, ethylene group, propylene group (trimethylene group or methylethylene group), butylene group (tetramethylene group or methylpropylene group), and hexamethylene group, the most preferred being ethylene group and trimethylene group. $R^3$ is independently hydrogen atom or an alkyl group containing 1 to 4 carbon atoms which is optionally substituted with fluorine. The alkyl group containing 1 to 4 carbon atoms may be those mentioned for the $R^1$. $Rf^1$ is a perfluoroalkylene group or a divalent group containing a perfluoropolyether structure.

Examples of the perfluoroalkylene group include straight chain and branched perfluoroalkylene groups containing 2 to 10 carbon atoms, and preferably 2 to 6 carbon atoms. The divalent group having a perfluoropolyether structure is the one containing a number of repetitive units each represented by the formula:

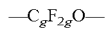

wherein g is an integer of 1 to 6, for example, the one represented by the following formula (2):

$$—(C_gF_{2g}O)_h— \qquad (2)$$

wherein g is an integer of 1 to 6, and h is an integer of 20 to 600, preferably 30 to 400, and more preferably 30 to 200.

Examples of the constitutional repeating unit represented by the formula $—C_gF_{2g}O—$ include those represented by the following formulae:

$$—CF_2O—,$$

$$—CF_2CF_2O—,$$

$$—CF_2CF_2CF_2O—,$$

$$—CF(CF_3)CF_2O—,$$

$$—CF_2CF_2CF_2CF_2O—,$$

$$—CF_2CF_2CF_2CF_2CF_2CF_2O—, \text{ and}$$

$$—C(CF_3)_2O—.$$

Of these, the preferred are those represented by the following formulae:

$$—CF_2O—,$$

$$—CF_2CF_2O—,$$

$$—CF_2CF_2CF_2O—, \text{ and}$$

$$—CF(CF_3)CF_2O—.$$

The divalent group having a perfluoropolyether structure may comprise one type of such constitutional repeating unit or two or more in combination of such constitutional repeating units.

The group having a divalent perfluoropolyether structure is preferably the one selected from the group consisting of structures represented by the following formulae (3) to (5):

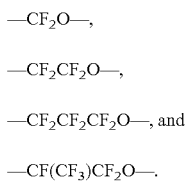

wherein Y is fluorine atom or trifluoromethyl group, and p, q, and r are independently an integer satisfying that p≥0, q≥0, 0≤p+q≤600, and 0≤r≤6 excluding p=q=r=0;

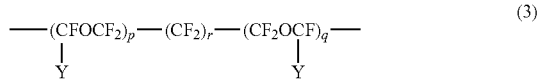

wherein Y is fluorine atom or trifluoromethyl group, v and w are independently an integer satisfying that 0≤v≤300 and 0≤w≤300 with the proviso that 1≤v+w≤600; and $$—CF_2CF_2—(OCF_2CF_2CF_2)_z—OCF_2CF_2— \qquad (5)$$

wherein z is an integer of 1≤z≤600.

Examples of the $Rf^1$ in the formula (1) include those represented by the following formulae:

$$—C_4F_8— \qquad —C_6F_{12}—$$

-continued

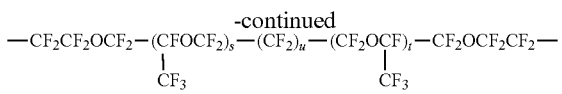

wherein s, t, and u are independently an integer satisfying that s≥0, t≥0, and 0≤s+t≤200, and in particular, 2≤s+t≤150, and 0≤u≤6; and

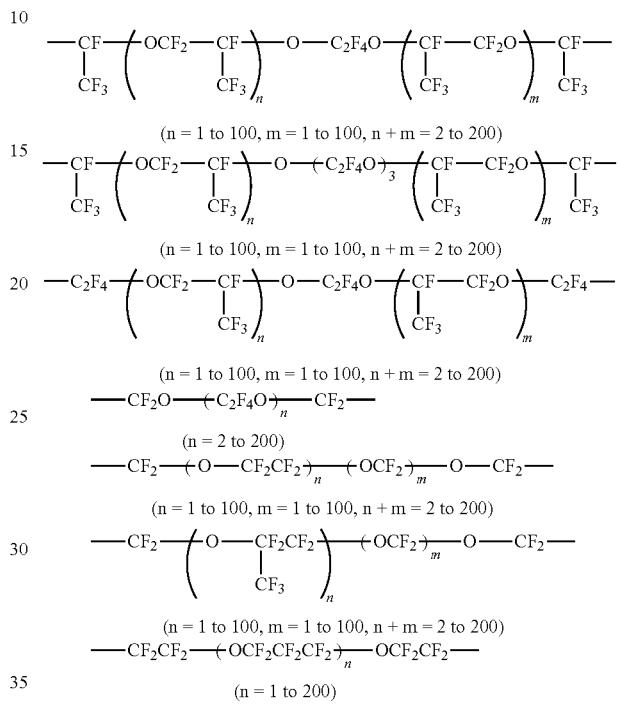

The straight chain fluorine-containing polymer of the formula (1) preferably has a number average molecular weight as measured by gel permeation chromatography (GPC) versus polystyrene of 1,000 to 100,000, and more preferably 3,000 to 30,000. When the number average molecular weight is less than 1,000, the resulting product will not be able to meet the required chemical resistance, while the number average molecular weight in excess of 100,000 will result in the insufficient compatibility with other components.

In the present invention, in order to adjust the number average molecular weight of the straight chain fluorine-containing polymer of the formula (1) to the desired range, the straight chain fluorine-containing polymer of the formula (1) may be preliminarily hydrosililated by reacting with the straight chain perfluoro compound containing 2 hydrosilyl groups (SiH groups) in the molecule using the method and the conditions commonly used in the art for chain extension, and the resulting compound may be used for the component (a).

The straight chain fluorine-containing polymer of component (a) may be used alone or in combination of two or more such polymers.

Component (b)

The fluorine-containing organosilicon compound of the component (b) is a fluorine-containing organosilicon compound having at least two hydrogen atoms bonded to the silicon atom (namely, the hydrosilyl group represented by SiH) per molecule, and this component functions as a crosslinking agent (and chain extender) for the component (a). In view of the compatibility, dispersibility, and homogeneity after the curing, the fluorine-containing organosilicon compound of the component (b) is not particularly limited as long as the organosilicon compound has at least one monovalent or divalent fluorine-containing organic group (perfluoroalkyl group, a monovalent group containing a perfluoropolyether structure, or the like in the case of the monovalent fluorine-containing organic group; and perfluoroalkylene group, a divalent group containing a perfluoropolyether structure, or the like in the case of the divalent fluorine-containing organic group) per molecule, and at least 2 and preferably at least 3 hydrogen atoms bonded to the silicon atom per molecule.

Examples of the monovalent fluorine-containing organic group are those represented by the following formulae:

wherein a is an integer of 1 to 10, and preferably 2 to 8, and

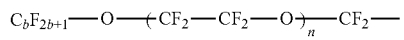

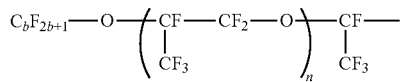

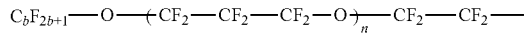

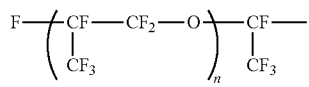

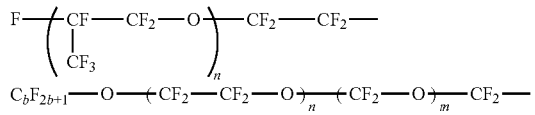

wherein b is an integer of 1 to 6, n and m are independently an integer satisfying that $0 \leq m \leq 100$, and $0 \leq n \leq 100$, with the proviso that $0 \leq m+n \leq 100$.

Examples of the divalent fluorine-containing organic group are those represented by the following formulae:

wherein c is an integer of 1 to 10, and preferably 2 to 8;

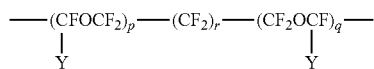

wherein Y is fluorine atom or trifluoromethyl group, p, q, and r are independently an integer satisfying that $p \geq 0$, $q \geq 0$, $0 \leq p+q \leq 600$, and in particular, $2 \leq p+q \leq 200$, and $0 \leq r \leq 6$ excluding r=p=q=0;

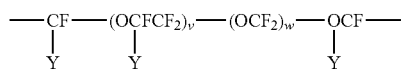

wherein Y is fluorine atom or trifluoromethyl group, v and w are independently an integer satisfying that $0 \leq v \leq 300$ and $0 \leq w \leq 300$ with the proviso that $1 \leq v+w \leq 600$; and

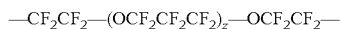

wherein z is an integer of $1 \leq z \leq 600$.

The monovalent or divalent fluorine-containing organic group may be either the one directly bonded to the silicon atom, or the one bonded to the silicon atom through an intervening divalent linkage group. The divalent linkage group may be an alkylene group, an arylene group, or a combination thereof, or any of such group having intervening ether bond oxygen atom, amide bond, carbonyl bond, or the like. The divalent linkage group may be the one containing 2 to 12 carbon atoms such as those represented by the following formulae:

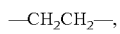

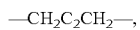

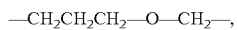

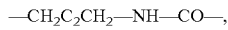

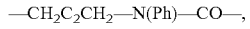

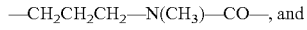, and

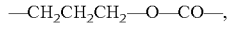

wherein Ph represents phenyl group.

Examples of the monovalent organic group bonded to the silicon atom of the component (b) other than the monovalent or divalent fluorine-containing organic group as described above include unsubstituted or substituted monovalent hydrocarbon groups having 1 to 20 carbon atoms. More specifically, examples include alkyl groups such as methyl group, ethyl group, propyl group, butyl group, hexyl group, cyclohexyl group, octyl group, and decyl group; aryl groups such as phenyl group, tolyl group, and naphthyl group; aralkyl groups such as benzyl group and phenylethyl group; or substituted hydrocarbon group in which some of the hydrogen atoms are substituted with chlorine atom, cyano group, or the like, such as chloromethyl group, chloropropyl group, and cyanoethyl group.

The fluorine-containing organosilicon compound of the component (b) may have a straight, branched or cyclic structure, or alternatively, a three dimensional network structure. The number of silicon atoms in the molecule of the fluorine-containing organosilicon compound is not particularly limited. However, the number of the silicon atom is typically 2 to 60, and in particular, 3 to 30.

Examples of such organosilicon compound include organosilicon compounds having a siloxane structure and/or a silalkylene structure represented by the following formulae, which may be used alone or in combination of two or more. In each formula, a, b, m, and n are independently an integer indicate below the formula.

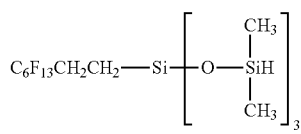 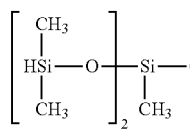 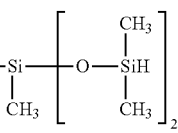
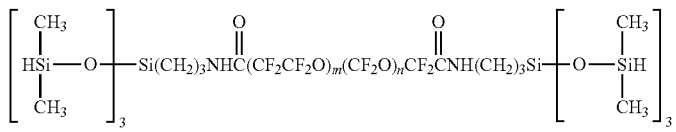
(n = 1 to 50, m = 1 to 50, n + m = 2 to 100)
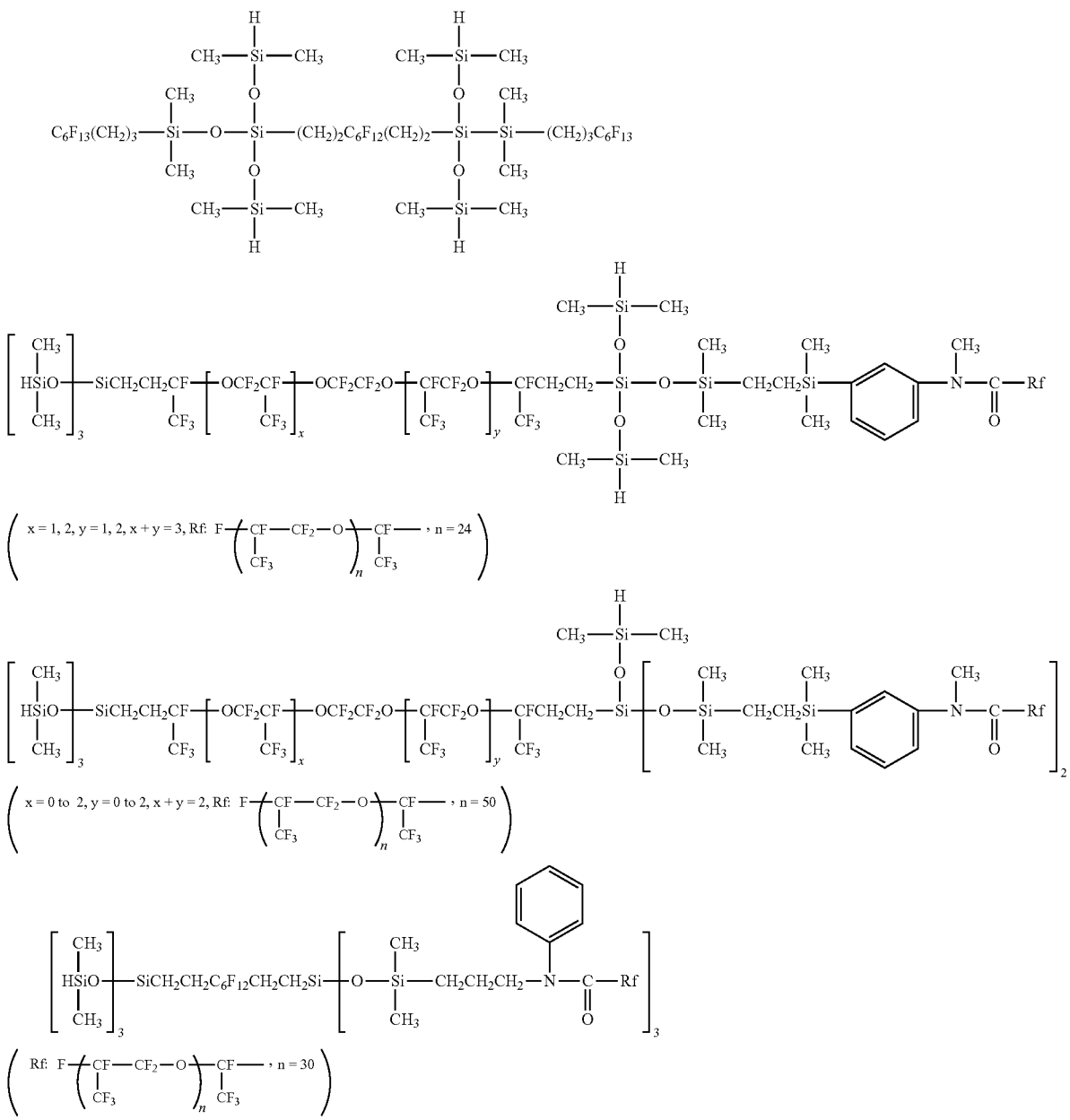

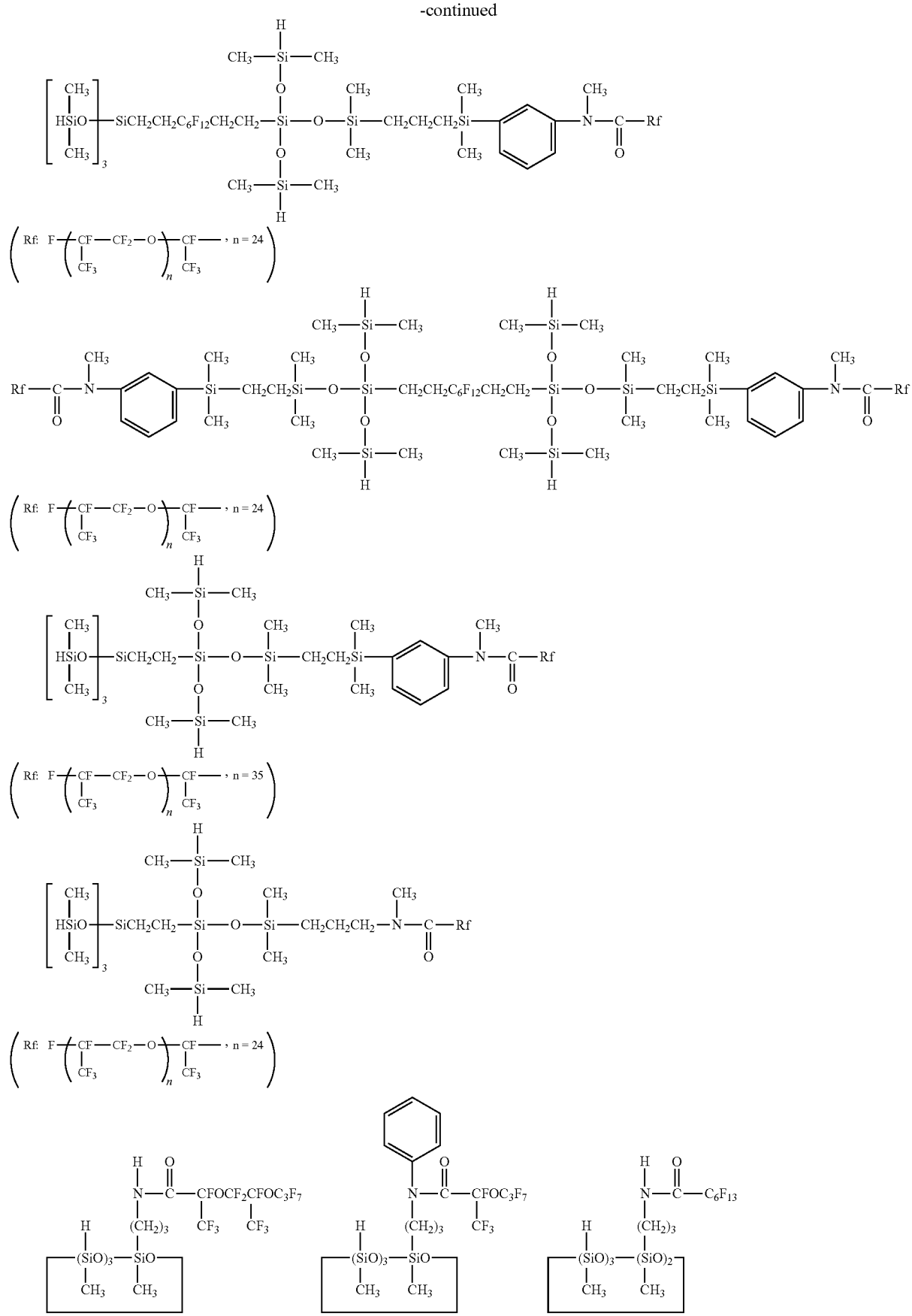

-continued
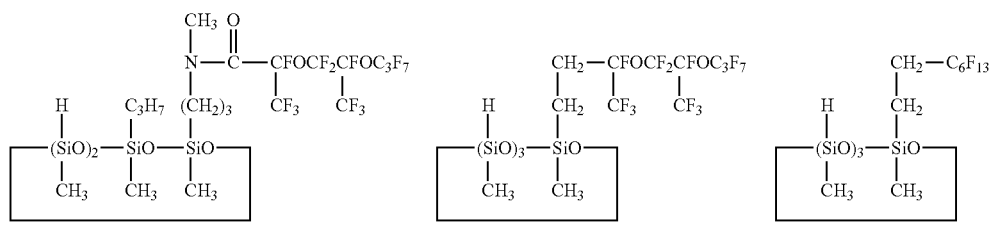
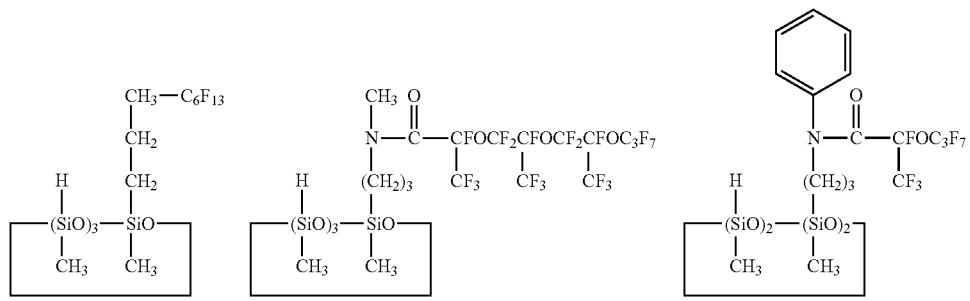
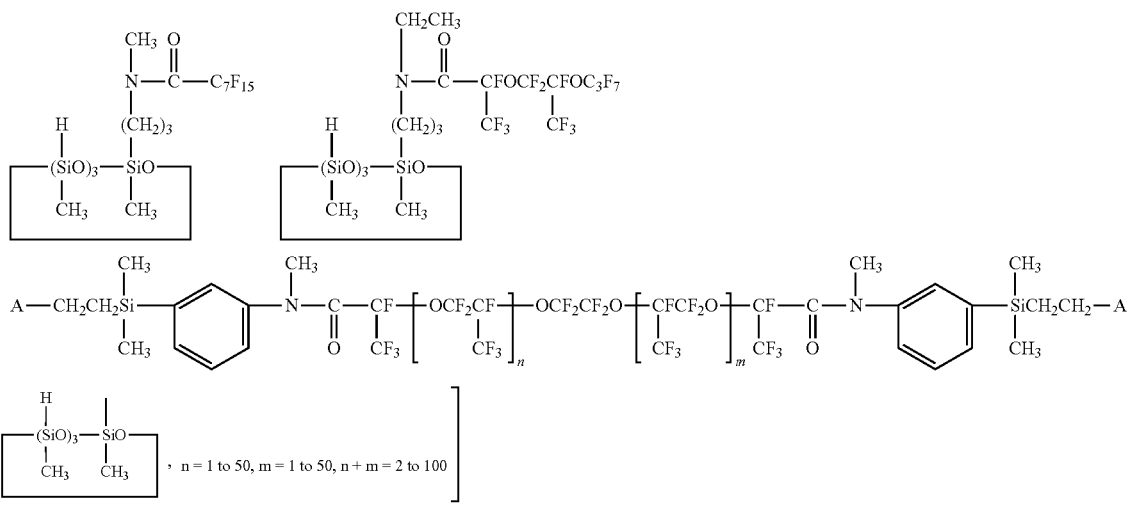
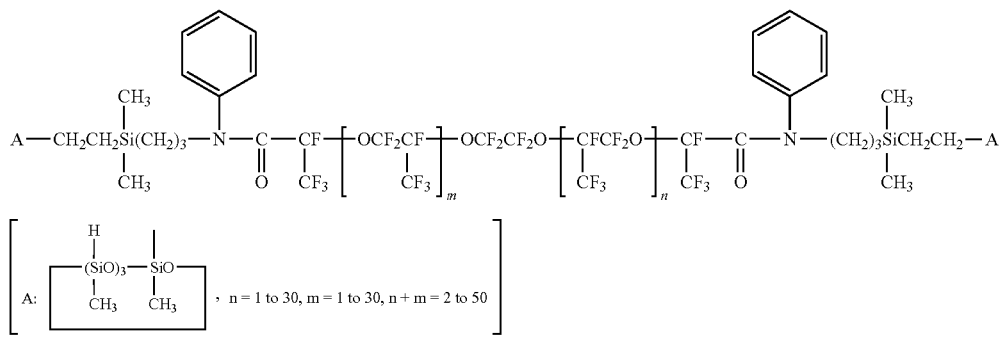
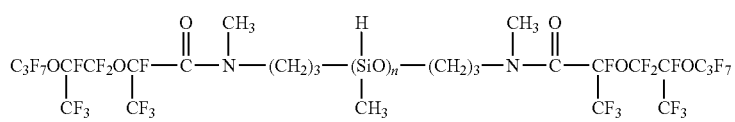
(n = 3 to 50)

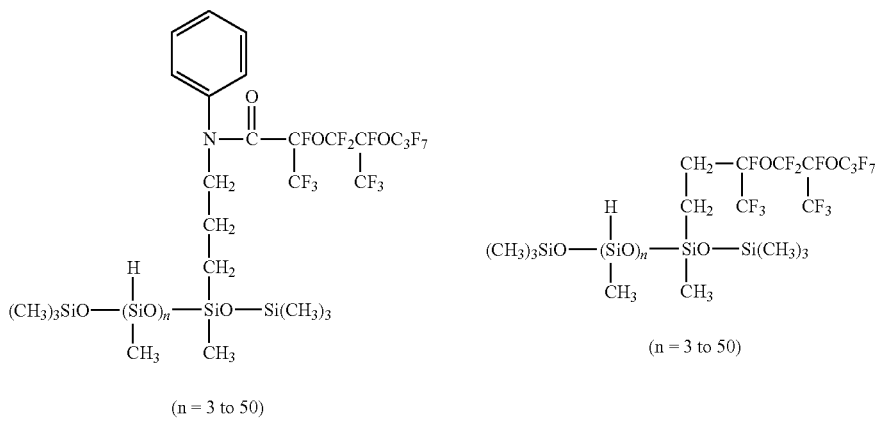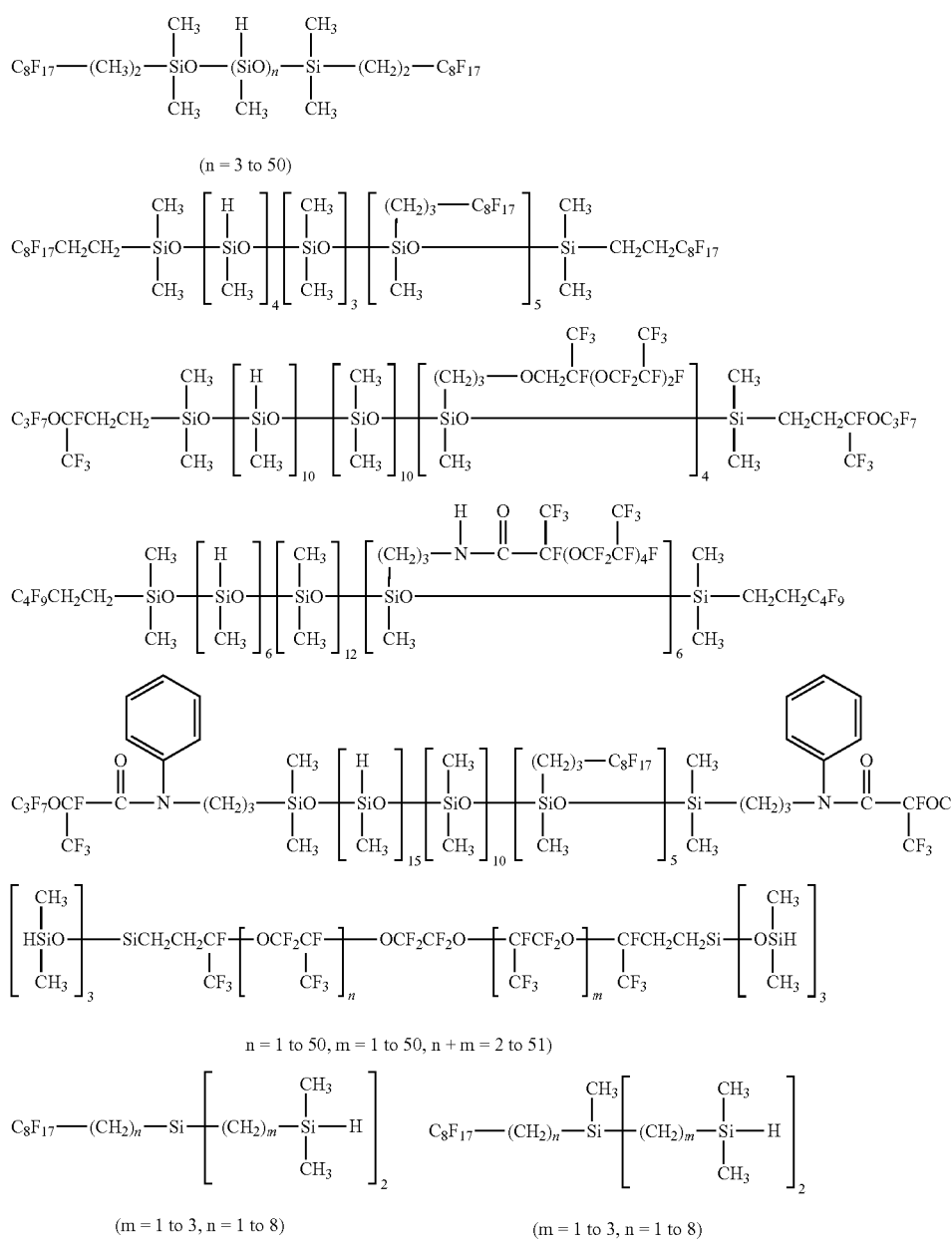

-continued
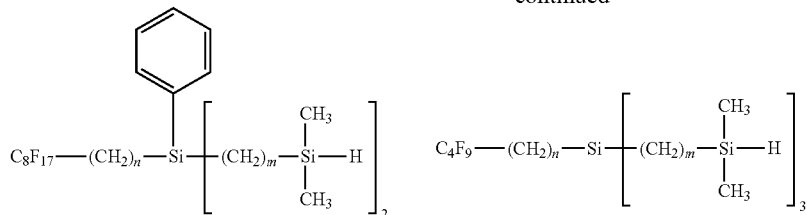
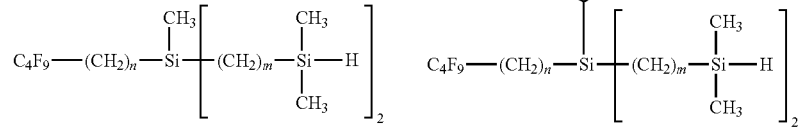
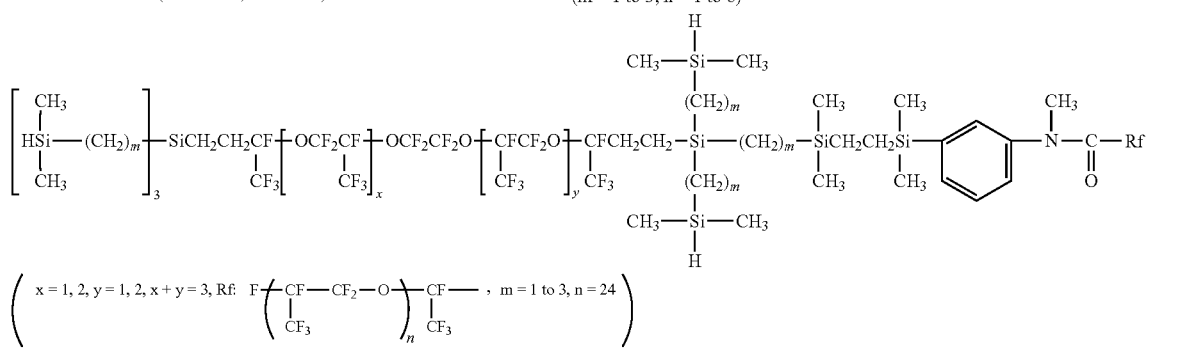
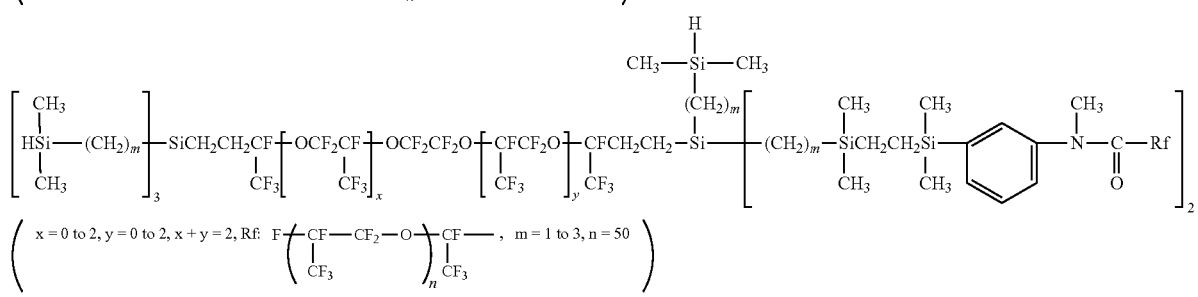
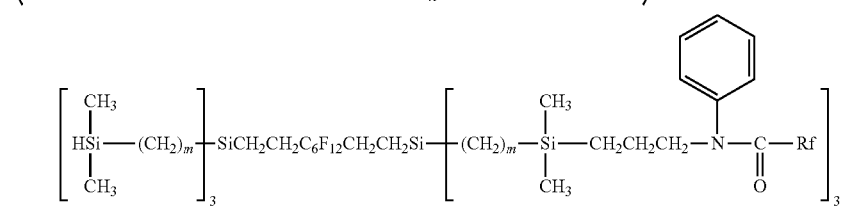
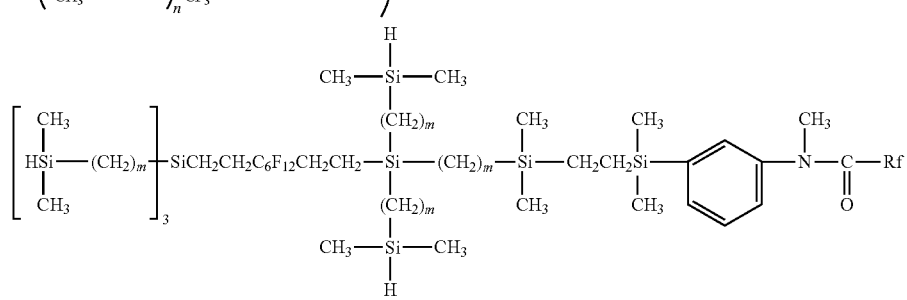

-continued

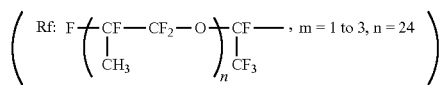

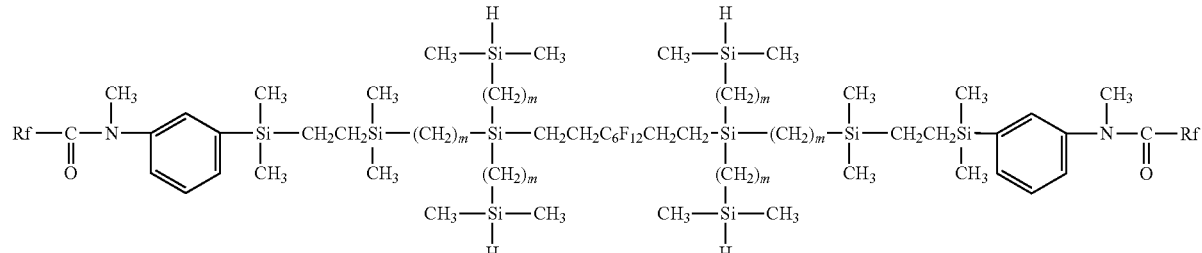

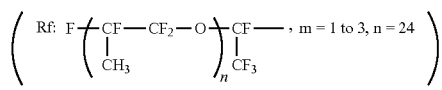

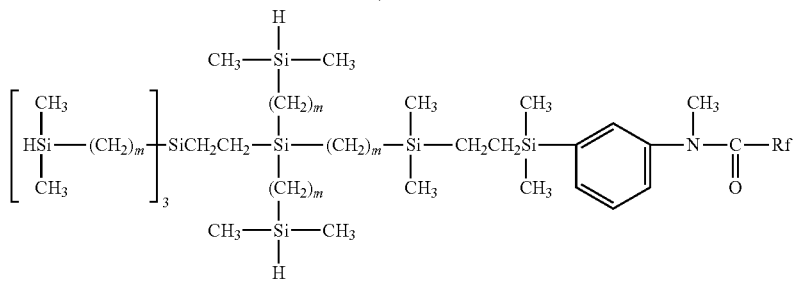

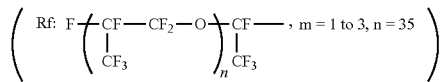

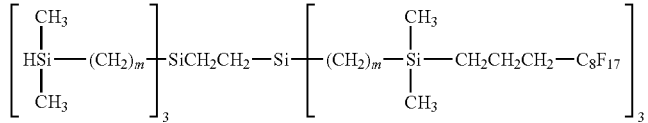

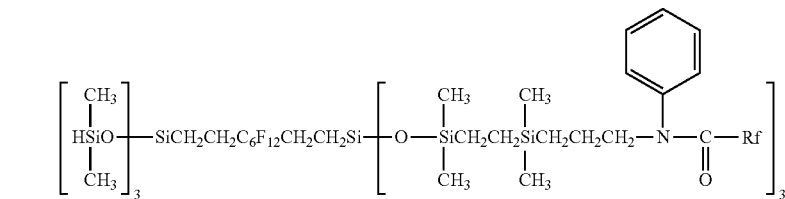

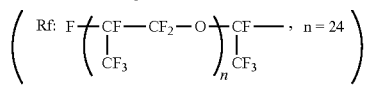

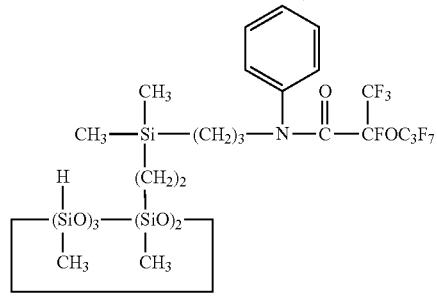

The component (b) is typically incorporated in an amount such that a ratio of the molar amount of all hydrosilyl groups (namely, SiH groups) in the component (b) to mole of the alkenyl groups such as vinyl group, allyl group, and cycloalkenyl group in the component (a) is 0.4 to 5.0, and preferably 0.8 to 3.0. Insufficient amount of the hydrosilyl group in the component (b) will result in the insufficient degree of crosslinking, and hence, in the insufficient hardness of the cured article while excessive presence of the hydrosilyl group also results in the insufficient strength of the cured article. The component (b) may be used alone or in combination of two or more such components.

Component (c)

The hydrosilylation catalyst of component (c) is preferably a transition metal, for example, a platinum group metal such as Pt, Rh, and Pd, or a compound of such transition metal. Since most of such compounds are compounds of a noble metal which are expensive, the preferred in the present invention are platinum and platinum compounds which are relatively easily available.

Non-limiting examples of the platinum compound include chloroplatinic acid its complex with an olefin such as ethylene, its complex with an alcohol or vinyl siloxane, platinum/silica, alumina, and carbon.

Examples of the platinum group metallic compounds other than the platinum compounds include rhodium, ruthenium, iridium, and palladium compounds such $RhCl(PPh_3)_3$, $RhCl(CO)(PPh_3)_2$, $RhCl(C_2H_4)_2$, $Ru_3(CO)_{12}$, $IrCl(CO)(PPh_3)_2$, and $Pd(PPh_3)_4$ wherein Ph represents phenyl group.

The catalyst is not preferably limited for its amount, and desired curing speed is realized by using the so-called "catalytic amount". However, the catalyst is preferably used at 0.1 to about 1,000 ppm, and more preferably at 0.1 to about 500 ppm in terms of platinum group metal in relation to the entire composition in view of economy as well as production of good cured articles.

Component (d)

Component (d) of the present invention is a silica filler. Examples of the silica filler include a pulverized silica produced by pulverizing quarts or glass, a molten silica produced by melting silica and forming into spheres, a wet silica or precipitated silica produced by adding a mineral acid to sodium silicate, and a dry silica or fumed silica produced by burning a silane compound. Of these, the preferred is a silica filler having a BET specific surface area of at least 30 $m^2$/g in view of improving the mechanical strength, and such silica fillers include both wet silica (precipitated silica) and dry silica (fumed silica), and a dry silica (fumed silica) having a lower moisture adsorption is preferable. In view of the wettablity by the polymer component, the preferred are those having a hydrophobicized silica filler. When the surface of the silica filler is not hydrophobicized, problems such as insufficient mechanical strength and unduly high viscosity of the composition may be induced.

The component (d) is preferably incorporated at 1 to 100 parts by weight per 100 part by weight of the component (a). Content of less than 1 part by weight is insufficient for realizing the reinforcement function of the filler whereas content in excess of 100 parts by weight results in unduly high viscosity of the composition, and hence, poor workability.

Other Components

In addition to the components (a) to (d) as described above, the composition of the present invention may also contain various additives known to the art at a content not adversely affecting the merits of the present invention. Exemplary additives include regulators of the hydrosilylation catalyst such as 1-ethyl-1-hydroxycyclohexane and acetylene alcohols such as 3-methyl-1-butyn-3-ol, 3,5-dimethyl-1-hesyne-3-ol, 3-methyl-1-pentin-3-ol, and phenylbutynol, 3-methyl-3-penten-1-in, and 3,5-dimethyl-3-hexen-1-in; pigments such as iron oxide, cerium oxide, and carbon black; colorants, dyes, antioxidants, and partially or entirely fluorinated oil compounds. These optional components may be added at an amount not adversely affecting the merits of the present invention.

Method of Using the Composition

Depending on the application, the composition of the present invention may be constituted as a so-called one part composition in which all critical components, namely, the components (a) to (d) as described above are incorporated in one composition; or as a so-called two part composition constituted from one composition comprising the components (a), (c), and (d) and the other composition comprising the components (a), (b), and (d), which may be mixed immediately before its use.

The composition may also be used after dissolution or dilution in a solvent. The solvent which may be used for such dissolution or dilution include those capable of dissolving the component (a), for example, fluoride solvents such as $C_4F_{10}$, $C_8F_{18}$, $C_4F_9OCH_3$, $C_4F_9OC_2H_5$, 2-n-nonafluoro butyl-tetrafluorofuran, tris(n-nonafluoro butyl)amine, meta-xylene hexafluoride, para-xylene hexafluoride, and benzotrifluoride.

The fluorine-containing curable composition of the present invention can be readily cured by leaving the composition at normal temperature or by heating. Preferred is a thermal curing at room temperature (for example, 5 to 35° C.) to 200° C. for 1 minute to 24 hours, and such curing is capable of producing a rubber having excellent properties.

The composition of the present invention has high fluorine content, and therefore it has excellent solvent resistance, chemical resistance, and acid resistance as well as high releasability and water repellency due to low moisture permeability and low surface energy. Accordingly, the composition of the present invention can be used for a variety of applications. Exemplary preferable applications include rubber parts for automobiles requiring oil resistance, for example, diaphragms such as fuel regulator diaphragms, pulsation damper diaphragms, oil pressure switch diaphragms, and EGR diaphragms, valves such as canister valves and power control valves, O-rings such as quick connector O-rings and injector O-rings, and seals such as oil seals and cylinder head gaskets. Other preferable applications include rubber parts for chemical plants, for example, seals such as pump diaphragms, valves, O-rings, hoses, packings, oil seals, and gaskets; rubber parts for ink jet printers and semiconductor manufacturing lines; seals for instruments which becomes in contact with chemicals such as diaphragms, valves, O-rings, packings, and gaskets; valves requiring low abrasion and wear resistance; rubber parts for analytical and scientific instruments such as pump diaphragms, valves, and sealing parts (O-rings and packings), and rubber parts for medical equipment such as pump, valve, and joints. Other applications include tent coating materials, sealants, molded parts, extruded parts, coats, copier roll materials, electrical and electronic moisture-proof coatings, sensor potting materials, laminate rubber fabrics; rubber parts for aircraft, for example, O-rings, face seals, packings, gaskets, diaphragms, and valves for piping of fuels such as engine oil, jet fuel, hydraulic oil and Skydrol.

EXAMPLE

Next, the present invention is described by referring to Examples and Comparative Examples which by no means limit the scope of the present invention. It is to be noted that the viscosity is the value measured at 25° C. using a Cannon-Fenske viscometer, and the number average molecular weight is the value measured by gel permeation chromatography (GPC) versus polystyrene. In the following formulae, Me denotes methyl group.

Example 1

100 parts by weight of a polymer represented by the following formula (6):

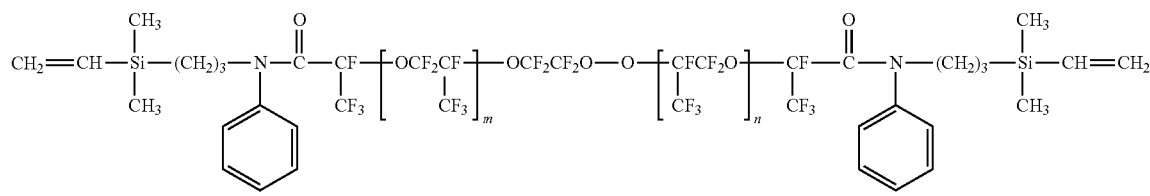

wherein average of m+n is 95 having a viscosity of 5,700 mm$^2$/s, a number average molecular weight of 16,000, and a vinyl group content of 0.0123 mole/100 g; and 40 parts by weight of R972 (a dry silica or fumed silica manufactured by Nippon Aerosil Co., Ltd.) were mixed in a kneader at 175° C. for 2 hours. Next, 100 parts by weight the polymer represented by the formula (6) was added in a planetary mixer so that the content of the R972 was 20 parts by weight, and the resulting mixture was kneaded with a three roll mill. Next, to 120 parts by weight of the mixture, 3.5 parts by weight of the fluorine-containing organosilicon compound represented by the following formula (7):

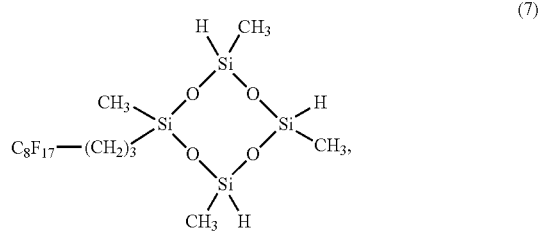

0.1 part by weight of a toluene solution of a catalyst comprising chloroplatinic acid modified with CH$_2$=CHSiMe$_2$OSiMe$_2$CH=CH$_2$ (platinum concentration, 0.5% by weight), and 0.15 part by weight of 50% toluene solution of ethynylcyclohexanol were added, and the mixture was mixed in a planetary mixer to produce a fluorine-containing curable composition. The measurements as described below were conducted by using the resulting composition.

Curing Speed

Both t10 (time (in second) required to reach 10% of the maximum torque) and t30 (time (in second) required to reach 30% of the maximum torque) were measured by using MDR2000 manufactured by Alpha Technology Co., LTD. under the conditions of the temperature of 130° C. and a measurement time of 10 minutes to evaluate the curing speed.

Rubber Physical Properties of the Cured Article

The mixture was crosslinked by pressing at 150° C. for 10 minutes (primary crosslinking) and then placing in an oven at 180° C. for 2 hours (secondary crosslinking) to thereby prepare a cured sheet having a size of 170 mm×130 mm×2 mm and a cured sheet having a size of 130 mm×130 mm×1 mm. The resulting cured sheet was evaluated for physical properties (hardness, tensile strength, and elongation at break) according to JIS K6253 and JIS K6251.

Acid Resistance

The cured sheet was immersed in concentrated sulfuric acid under the temperature condition of 40° C. for 7 days, to observe change in the hardness and surface condition.

The results of the curing speed are shown in Table 1, the results of the measurement of the rubber physical properties of the cured article are shown in Table 2, and the results of the acid resistance measurement are shown in Table 3.

Example 2

100 parts by weight of a polymer represented by the following formula (6):

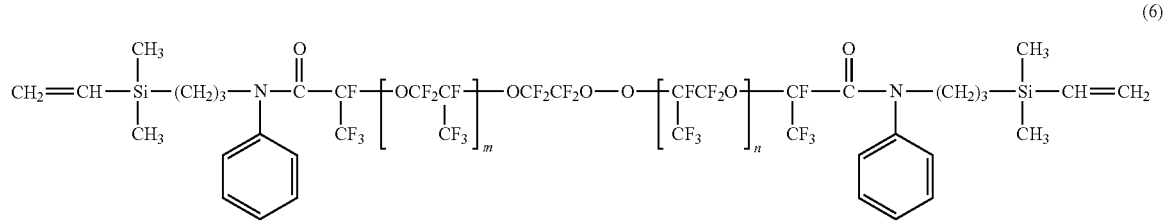

wherein average of m+n is 95 having a viscosity of 5,700 mm$^2$/s, a number average molecular weight of 16,000, and a vinyl group content of 0.0123 mole/100 g; and 50 parts by weight of dry silica or fumed silica filler having its surface treated with hexamethyldisilazane having a specific surface area of 300 m$^2$/g were mixed in a kneader at 175° C. for 2 hours. Next, 100 parts by weight the polymer represented by the formula (6) was added in a planetary mixer so that the content of the silica filler was 25 parts by weight, and the resulting mixture was kneaded with a three roll mill. Next, to 125 parts by weight of the mixture, 3.0 parts by weight of the fluorine-containing organosilicon compound represented by the following formula (8):

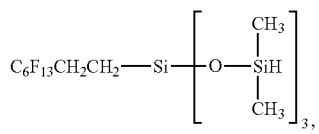

(8)

0.1 part by weight of a toluene solution of a catalyst comprising chloroplatinic acid modified with CH$_2$=CHSiMe$_2$OSiMe$_2$CH=CH$_2$ (platinum concentration 0.5% by weight), and 0.15 part by weight of 50% toluene solution of ethynylcyclohexanol were added, and the mixture was mixed in a planetary mixer to produce a fluorine-containing curable composition. The measurements of curing speed, rubber physical properties of the cured article, and acid resistance were conducted as in the case of Example 1 by using the resulting composition.

Comparative Example 1

100 parts by weight of a polymer represented by the following formula (9):

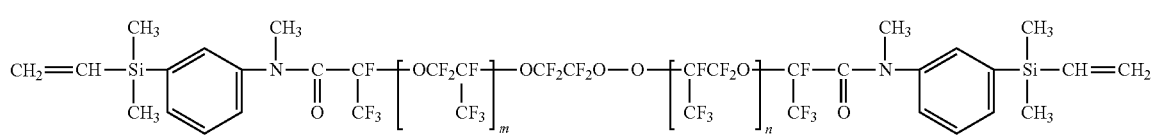

(9)

wherein average of m+n is 92 having a viscosity of 5,500 mm$^2$/s, a number average molecular weight of 15,700, and a vinyl group content of 0.0120 mole/100 g; and 50 parts by weight of dry silica or fumed silica filler having its surface treated with hexamethyldisilazane having a specific surface area of 300 m$^2$/g were mixed in a kneader at 175° C. for 2 hours. Next, 100 parts by weight the polymer represented by the formula (9) was added in a planetary mixer so that the content of the silica filler was 25 parts by weight, and the resulting mixture was kneaded with a three roll mill. Next, to 125 parts by weight of the mixture, 2.9 parts by weight of the fluorine-containing organosilicon compound represented by the following formula (8):

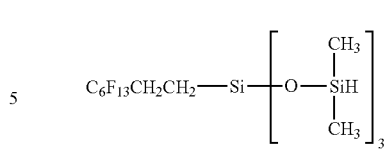

(8)

and 0.1 part by weight of a toluene solution of catalyst comprising chloroplatinic acid modified with CH$_2$=CHSiMe$_2$OSiMe$_2$CH=CH$_2$ (platinum concentration 0.5% by weight), and 0.15 part by weight of 50% toluene solution of ethynylcyclohexanol were added, and the mixture was mixed in a planetary mixer to produce a fluorine-containing curable composition. The measurements of curing speed, rubber physical properties of the cured article, and acid resistance were conducted as in the case of Example 1 by using the resulting composition.

Comparative Example 2

100 parts by weight of a polymer represented by the following formula (10):

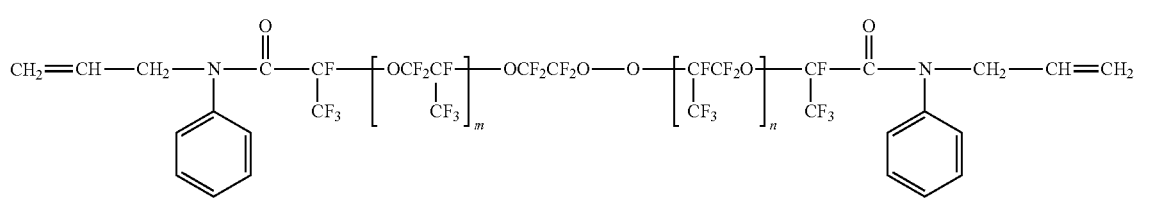

(10)

wherein average of m+n is 90 having a viscosity of 3,800 mm$^2$/s, a number average molecular weight of 15,500, and a vinyl group content of 0.0121 mole/100 g; and 50 parts by weight of dry silica or fumed silica filler having its surface treated with hexamethyldisilazane having a specific surface area of 300 m$^2$/g were mixed in a kneader at 175° C. for 2 hours. Next, 100 parts by weight the polymer represented by the formula (10) was added in a planetary mixer so that the content of the silica filler was 25 parts by weight, and the resulting mixture was kneaded with a three roll mill. Next, to 125 parts by weight of the mixture, 2.9 parts by weight of the fluorine-containing organosilicon compound represented by the following formula (8):

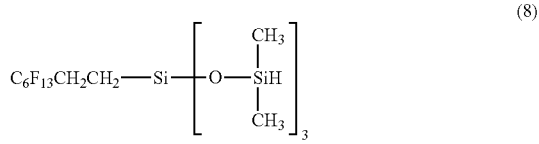

(8)

and 0.1 part by weight of a toluene solution of catalyst comprising chloroplatinic acid modified with $CH_2=CHSiMe_2OSiMe_2CH=CH_2$ (platinum concentration 0.5% by weight), and 0.15 part by weight of 50% toluene solution of ethynylcyclohexanol were added, and the mixture was mixed in a planetary mixer to produce a fluorine-containing curable composition. The measurements of curing speed, rubber physical properties of the cured article, and acid resistance were conducted as in the case of Example 1 by using the resulting composition.

TABLE 1

|  | Example | | Comparative Example | |
|---|---|---|---|---|
|  | 1 | 2 | 1 | 2 |
| t10(s) | 25 | 23 | 22 | 35 |
| t80(s) | 43 | 40 | 40 | 92 |

TABLE 2

|  | Example | | Comparative Example | |
|---|---|---|---|---|
|  | 1 | 2 | 1 | 2 |
| Hardness (Durometer type A) | 49 | 55 | 54 | 52 |
| Tensile strength (MPa) | 8.2 | 10.3 | 10.7 | 9.2 |
| Elongation at break (%) | 290 | 350 | 350 | 320 |

TABLE 3

|  | Example | | Comparative Example | |
|---|---|---|---|---|
|  | 1 | 2 | 1 | 2 |
| Hardness (initial) | 49 | 55 | 54 | 52 |
| Hardness after immersing in conc. sulfuric acid | 49 | 55 | 47 | 52 |
| Change in the hardness | 0 | 0 | −7 | 0 |
| Surface condition after immersing in conc. sulfuric acid | No change | No change | Deteriorated | No change |

The compositions of Comparative Examples 1 and 2 are different from the composition of Example 2 only in their component (a).

The composition of Example 1 having the Si-vinyl structure at its terminal exhibited excellent curability. The composition of Example 2 having the Si-vinyl structure at its terminal also exhibited high curing speed and good curability although this composition had different component (b) from the composition of Example 1.

On the other hand, the composition of Comparative Example 1 having the Si-vinyl structure at its terminal and exhibiting high curing speed and good curability exhibited poor acid resistance due to the aromatic ring-Si structure at its terminal. The composition of Comparative Example 2 without the Si-vinyl structure at its terminal exhibiting low curing speed. However, this composition exhibited high acid resistance.

The results as described above reveal that the fluorine-containing curable composition of the present invention is particularly excellent in the curing speed and the acid resistance.

Japanese Patent Application No. 2010-067876 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A fluorine-containing curable composition comprising
    (a) 100 parts by weight of a straight chain fluorine-containing polymer having at least two alkenyl groups per molecule represented by the following formula (1):

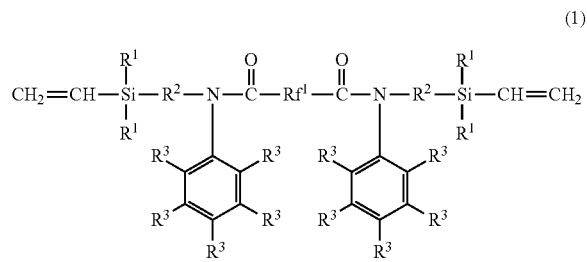

(1)

wherein $R^1$ is independently vinyl group or an alkyl group containing 1 to 4 carbon atoms, $R^2$ is an alkylene group containing 1 to 6 carbon atoms, $R^3$ is independently hydrogen atom or an alkyl group containing 1 to 4 carbon atoms which is optionally substituted with fluorine, $Rf^1$ is a group having a perfluoroalkylene group or a divalent group having perfluoropolyether structure, said polymer having a number average molecular weight of 1,000 to 100,000;
    (b) a fluorine-containing organosilicon compound having at least 2 hydrogen atoms bonded to the silicon atom per molecule at an amount such that a molar ratio of hydrosilyl group (SiH group) in the component (b) to the alkenyl group in the component (a) is in the range of 0.4 to 5.0;
    (c) a catalytic amount of a hydrosilylation catalyst; and
    (d) 1 to 100 parts by weight of a silica filler.

2. A fluorine-containing curable composition according to claim 1 wherein the group having the divalent perfluoropolyether structure has the structure represented by the following formula (2):

(2)

wherein g is an integer of 1 to 6, and h is an integer of 20 to 600.

3. A fluorine-containing curable composition according to claim 2 wherein the group having the divalent perfluoropolyether structure has a structure selected from the group consisting of structures represented by the following formulae (3) to (5):

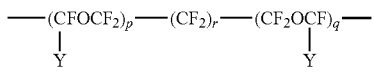 (3)

wherein Y is fluorine atom or trifluoromethyl group, p, q, and r are independently an integer satisfying that p≥0, q≥0, 0≤p+q≤600, and 0≤r≤6 excluding p=q=r=0;

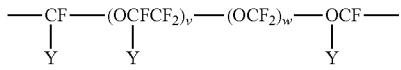 (4)

wherein Y is fluorine atom or trifluoromethyl group, v and w are independently an integer satisfying that 0≤v≤300 and 0≤w≤300 with the proviso that 1≤v+w≤600; and

 (5)

wherein z is an integer of 1≤z≤600.

4. A fluorine-containing curable composition according to claim 1 wherein the component (b) has at least 1 monovalent perfluoroalkyl group, monovalent group having a perfluoropolyether structure, divalent perfluoroalkylene group, or divalent group having a perfluoropolyether structure per molecule; and has at least 2 hydrogen atoms bonded to the silicon atom.

5. A fluorine-containing curable composition according to claim 1 wherein the component (d) is a silica filler having a hydrophobicized surface and a BET specific surface area of at least 30 m²/g.

6. A rubber article produced by using the fluorine-containing curable composition of claim 1.

* * * * *